UNITED STATES PATENT OFFICE.

BERNHARD PRIEBS AND OSKAR KALTWASSER, OF BERLIN, GERMANY, ASSIGNORS TO THE ACTIEN-GESELLSCHAFT FÜR ANILIN FABRIKATION, OF SAME PLACE.

BLACK DYE.

SPECIFICATION forming part of Letters Patent No. 628,608, dated July 11, 1899.

Application filed April 8, 1899. Serial No. 712,254. (Specimens.)

*To all whom it may concern:*

Be it known that we, BERNHARD PRIEBS and OSKAR KALTWASSER, of Berlin, in the Kingdom of Prussia, German Empire, have invented new and useful Improvements in the Production of Black Dye; and we do hereby declare that the following is a full, clear, and exact description thereof, which will enable others skilled in the art to which it appertains to make and use the same.

Our invention is based on the observation that dinitroöxydiphenylamin-carbonic acid

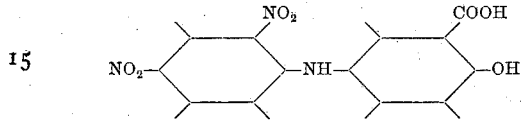

when heated with sulfur and alkalisulfid yields a coloring-matter dyeing unmordanted cotton deep black shades of remarkable intensity and fastness. The dinitroöxydiphenylamin-carbonic acid, from which we start, is obtained, as described by Dierbach in *Liebig's Annalen der Chemie*, tome 273, page 123, by interaction of 1:3:4 dinitrochlorbenzene and para-amidosalicylic acid.

The following directions will explain in what manner we proceed in order to carry out our invention: Twenty parts, by weight, of the sodium salt of dinitroöxydiphenylamin-carbonic acid, forty parts, by weight, of sulfur, and one hundred parts of crystallized sodium sulfid are heated, after addition of a small portion of water, to 130° to 140° centigrade for about one hour. The melt assumes a thick consistence and is then heated to somewhat higher temperature—say 160° to 170° centigrade—until it is reduced to such a degree of dryness that it may be pulverized after cooling. The product obtained in this way forms in dry state a black powder, which readily dissolves in water containing a small portion of alkalisulfid with a pure greenish-blue color. In fuming sulfuric acid containing about twenty per cent. anhydrid it dissolves with a grayish-green color. By the addition of ice to this solution a blue-black precipitate is formed. If a current of air is conducted through the aqueous solution of the dye, a bluish-black precipitate begins to separate out after some time. On further introduction of air a dull-blue solution is formed.

Our new dye produces on unmordanted cotton in an alkaline or salt bath deep-black shades. Owing to the application of a carbonic acid as starting product our new dye is easily soluble, dyes evenly, and the dye-baths remain clear and do not deposit insoluble matters during the dyeing process. The dyeing process may be effected without special precautions, the aqueous solutions of our dye being not liable to immediate further oxidation.

Instead of mixing the dinitroöxydiphenylamin-carbonic acid together with sulfur and alkalisulfid and heating this mixture we may also heat a mixture of alkalisulfid, sulfur, and small quantities of water up to 110° to 120° centigrade and introduce the dinitroöxydiphenylamin-carbonic acid or its sodium salt into this fused mixture. Further, the quantities of sulfur and sodium sulfid in the above example may be varied within wide limits, and we do not confine ourselves to the figures given in the above example.

Having now described our invention and in what manner the same can be performed, what we claim as new is—

The black dye which results from heating the sodium salt of dinitroöxydiphenylamin-carbonic acid

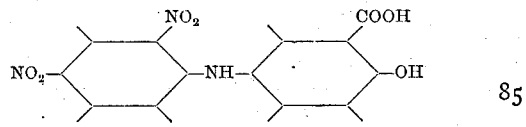

with sulfur and alkalisulfids; said dye being readily soluble in water with fine greenish-blue color; dissolving in fuming sulfuric acid with grayish-green color, from which solution on addition of ice a bluish-black precipitate is separated; the aqueous solution yielding by the introduction of a current of air after some time a precipitate, while on further introduction of air a dull-blue solution is formed; said dye producing on unmordanted cotton in an alkaline bath deep-black shades of remarkable intensity and fastness.

In witness whereof we have hereunto signed our names, this 22d day of March, 1899, in the presence of two subscribing witnesses.

BERNHARD PRIEBS.
OSKAR KALTWASSER.

Witnesses:
WOLDEMER HAUPT,
HENRY HASPER.